US008660985B2

(12) United States Patent  
Wang et al.

(10) Patent No.: US 8,660,985 B2  
(45) Date of Patent: Feb. 25, 2014

(54) MULTI-DIMENSIONAL OLAP QUERY PROCESSING METHOD ORIENTED TO COLUMN STORE DATA WAREHOUSE

(75) Inventors: Shan Wang, Beijing (CN); Yan-Song Zhang, Beijing (CN)

(73) Assignee: Renmin University of China, Beijing (CN)

( * ) Notice: Subject to any disclaimer, the term of this patent is extended or adjusted under 35 U.S.C. 154(b) by 0 days.

(21) Appl. No.: 13/514,294

(22) PCT Filed: May 16, 2012

(86) PCT No.: PCT/CN2012/075621  
§ 371 (c)(1),  
(2), (4) Date: Jun. 6, 2012

(87) PCT Pub. No.: WO2013/152543  
PCT Pub. Date: Oct. 17, 2013

(65) Prior Publication Data  
US 2013/0275365 A1 Oct. 17, 2013

(30) Foreign Application Priority Data

Apr. 11, 2012 (CN) .......................... 2012 1 0106380  
Apr. 17, 2012 (CN) .......................... 2012 1 0114111

(51) Int. Cl.  
*G06F 7/00* (2006.01)  
*G06F 17/00* (2006.01)

(52) U.S. Cl.  
USPC ........................................................ 707/602

(58) Field of Classification Search  
USPC .................. 707/766, 776, 918, 919  
See application file for complete search history.

(56) References Cited

U.S. PATENT DOCUMENTS

| | | | | |
|---|---|---|---|---|
| 6,947,934 | B1* | 9/2005 | Chen et al. ............................ 1/1 |
| 7,293,037 | B2* | 11/2007 | Chaudhuri et al. ........... 707/603 |
| 8,086,593 | B2* | 12/2011 | Surna et al. .................... 707/713 |
| 8,086,598 | B1* | 12/2011 | Lamb et al. .................... 707/714 |
| 8,140,586 | B2* | 3/2012 | Stolte et al. .................... 707/802 |
| 2005/0262039 | A1* | 11/2005 | Kreulen et al. .................... 707/1 |
| 2006/0010147 | A1* | 1/2006 | Arras et al. .................... 707/101 |
| 2008/0215556 | A1* | 9/2008 | Surna et al. ....................... 707/4 |
| 2008/0288524 | A1* | 11/2008 | Dumitru et al. ............... 707/102 |
| 2009/0055439 | A1* | 2/2009 | Pai et al. ......................... 707/200 |
| 2009/0157623 | A1* | 6/2009 | Bedi et al. .......................... 707/3 |
| 2009/0265375 | A1* | 10/2009 | Zhuge et al. ................... 707/102 |
| 2010/0017395 | A1* | 1/2010 | Wayn et al. ....................... 707/5 |
| 2010/0036803 | A1* | 2/2010 | Vemuri et al. ..................... 707/2 |
| 2010/0114976 | A1* | 5/2010 | Castellanos et al. .......... 707/803 |

(Continued)

*Primary Examiner* — Robert Beausoliel, Jr.  
*Assistant Examiner* — Nicholas Allen  
(74) *Attorney, Agent, or Firm* — Cheng-Ju Chiang (57) ABSTRACT

A multi-dimensional OLAP query processing method oriented to a column store data warehouse is described. With this method, an OLAP query is divided into a bitmap filtering operation, a group-by operation and an aggregate operation. In the bitmap filtering operation, a predicate is first executed on a dimension table to generate a predicate vector bitmap, and a join operation is converted, through address mapping of a surrogate key, into a direct dimension table tuple access operation; in the group-by operation, a fact table tuple satisfying a filtering condition is pre-generated into a group-by unit according to a group-by attribute in an SQL command and is allocated with an increasing ID; and in the aggregate operation, group-by aggregate calculation is performed according to a group item of a fact table filtering group-by vector through one-pass column scan on a fact table measure attribute.

10 Claims, 6 Drawing Sheets

(56) References Cited

U.S. PATENT DOCUMENTS

2010/0250517 A1\* 9/2010 Bendel et al. ................ 707/714
2011/0131250 A1\* 6/2011 Stolte et al. ................ 707/802
2012/0011096 A1\* 1/2012 Aggarwal .................... 707/602
2012/0265728 A1\* 10/2012 Plattner et al. ............... 707/607

\* cited by examiner

MULTI-DIMENSIONAL OLAP QUERY PROCESSING METHOD ORIENTED TO COLUMN STORE DATA WAREHOUSE

FIELD OF THE INVENTION

The present invention relates to an on-line analytical processing (OLAP) query processing method, and more particularly to a multi-dimensional OLAP query processing method oriented to a column store data warehouse and based on a star join model, which belongs to the technical field of database management.

BACKGROUND OF THE INVENTION

A design of on-line analytical processing (OLAP) aims to satisfy specific query and reporting requirements in a decision support or multi-dimensional environment. A data warehouse and the OLAP are important supporting technologies of enterprise-level decision supporting.

However, the performance of the OLAP over massive data is hard to satisfy the gradually increasing requirements on real-time high-performance analytical processing. The bottleneck of the performance mainly lies in the following two aspects: one is low hard disk I/O performance, and the other is insufficiently optimized query processing technology. A mainstream technology of improving the hard disk I/O performance is column store. The column store can realize storage and access of data according to columns. Recently, the query processing technology adopted by a column store database is mainly classified into two types: one is the column data query processing technology, and the other is that column store data is dynamically converted into row store data through a cache of data in a memory, and a conventional row store query processing technology is adopted.

The column data query processing technology refines relational algebra into column algebra, and divides the relational operation into several ordered column operations. The column data query processing technology requires a large number of materialized join indexes and additional cost for join operations between columns. In the OLAP query, a foreign key column in the fact table needs to be scanned twice to complete filtering and group-by operations, which increases additional I/O access overhead.

In the dynamic column/row conversion query processing technology widely adopted currently, accessing data according to columns improves the I/O efficiency of the projection operation; however, a pipeline query processing technology of row store is still adopted in the level of query processing. The pipeline query processing technology needs to first materialize join data required by the query, and when the selectivity is low, a large amount of materialized data is finally abandoned, which consumes additional memory bandwidth resources and degrades the processing performance of the memory.

The parallel OLAP is mainly applied in a main memory database. In a row store database, a representative technology is materializing multiple tables into one denormalized join table by using a materialized join method, performing parallel processing on distributed aggregate functions on the basis of a horizontal fragmentation mode, and merging aggregate result sets. This technology reduces the complexity of the query processing and increases the parallel speedup ratio, but requires larger space. On the column store model, a representative technology is performing logical horizontal fragmentation on the join operation between columns having large execution cost, performing parallel join, and merging parallel join results for the subsequent column operation. This technology has simple implementation procedure, but has higher workload proportion of serial processing, and overall parallel processing resources are not fully utilized.

In the application scenario of a disk resident database, the processing performance of the parallel OLAP is limited by the I/O performance of parallel disk access, and the parallel processing technology based on the horizontal fragmentation mode is rarely adopted, instead, a concurrent query processing technology of a shared disk scan mode is adopted. The core of the concurrent query processing technology is minimizing the memory processing time of the OLAP, so that as many concurrent query tasks as possible can be processed in one I/O latency. The conventional hash join generates a large number of hash tables in the concurrent query processing load, and the hash tables will exhaust the memory resources of the system, thereby causing poor performance of the hash join. The selectivity of the OLAP query is relatively high, and therefore, the concurrent query processing faces a larger performance bottleneck, and it is difficult to obtain desired performance in practice.

SUMMARY OF THE INVENTION

The objective of the present invention is to provide a multi-dimensional OLAP query processing method oriented to a column store data warehouse and based on a star-join model. The method is capable of improving the I/O performance of the column store, and implementing the OLAP query processing based on one-pass column scan.

According to the above objective, the present invention adopts the following technical solution.

A multi-dimensional OLAP query processing method oriented to a column store data warehouse is provided, in which the OLAP query is divided into a bitmap filtering operation, a group-by operation and an aggregate operation, and a fact table and dimension tables are stored by using a column store model, and the method is characterized as follows.

In the bitmap filtering operation, a predicate is executed on a dimension table to generate a predicate vector bitmap. During the query processing, multiple fact table foreign key attribute columns corresponding to a join operation are sequentially scanned, the join operation is converted, through address mapping of a surrogate key, into an access operation to the bitmap directly according to positions, and corresponding bits in corresponding dimension table predicate vectors are extracted to perform an AND operation, so as to determine whether the fact table tuple satisfies a join filtering condition.

In the group-by operation, the fact table tuple satisfying the filtering condition is pre-generated into a group-by unit according to a group-by attribute in an SQL command and is allocated with an increasing ID, and a vector value corresponding to a position of the record in a fact table filtering group-by vector is set as a current group ID.

In the aggregate operation, group-by aggregate calculation is performed according to the fact table filtering group-by vector through one-pass column scan on a fact table measure attribute.

Preferably, a dimensional attribute column is loaded into main memory to form a memory dimensional attribute array, in which a primary key is corresponding to a subscript of the memory dimensional attribute array.

A foreign key attribute value of the fact table tuple is mapped to a subscript of the memory dimensional attribute array in the corresponding dimension table.

The fact table and the dimension tables complete a multi-table join operation through a corresponding relation between the foreign key and the primary key.

Preferably, when the memory cannot accommodate all dimension tables, dimension table group-by attribute columns need to be accessed in the query processing are loaded into the memory to form memory dimensional vectors, a predicate operation is performed on the dimension tables, and predicate operation results are stored in a bitmap with the same length as the dimension table, to serve as predicate vectors for recording satisfaction states of different dimension table records with the predicate operation results.

Preferably, a group-by aggregate hash table and a fact table filtering group-by vector are pre-created, in which the group-by aggregate hash table is pre-created by using the group-by attributes and additional IDs in the query as objects, and the fact table filtering group-by vector is a numerical vector with the same length as the fact table.

Preferably, foreign key attribute groups with dimension table join relation in the fact table are sequentially scanned, each foreign key attribute group record is read, the fact table foreign key attribute value is directly mapped to a predicate vector subscript, and bit data recorded by the bit in the predicate vector is taken out to perform the AND operation.

If a result of the bit operation is false, a next foreign key attribute group record is read; and if the result of the bit operation is true, the value of each foreign key is mapped to a subscript of a dimension table group-by attribute vector.

Preferably, a designated data item in a group-by dimensional attribute vector is extracted and then hash group-by is performed, and if a current hash key value exists, the hash group ID is taken out and recorded in a position in the fact table filtering group-by vector and corresponding to the current fact table tuple; and if the current hash key value does not exist, a new hash group is created in a group-by hash table and allocated with an increasing ID, and at the same time, the hash group ID is recorded in a position in a fact table join vector and corresponding to the current fact table tuple.

Preferably, after the scan of the fact table foreign key attribute group is completed, the fact table filtering group-by vector and a preset group-by aggregate hash table are obtained, and an array of aggregate functions is created according to the maximum ID value, so as to serve as a group-by aggregate accumulator.

Preferably, when a non-zero data item is scanned in the fact table filtering group-by vector, a measure attribute column stored in a disk is accessed according to a vector subscript position, and the measure attribute value is sent to a unit with a subscript of the group-by aggregate accumulator array corresponding to the hash group ID value in the fact table filtering group-by vector, so as to perform the aggregate calculation.

Preferably, after the aggregate calculation is completed for all the measure attribute columns, the group-by aggregate hash table and each group-by aggregate accumulator are merged according to a sequence of the IDs and the array subscripts, so as to generate a final OLAP aggregate result.

Preferably, if the query processing procedure includes multiple aggregate functions, each aggregate function is sequentially processed by scanning the fact table filtering group-by vector.

The present invention has the following beneficial effects.

(1) High-performance OLAP query processing is implemented without using indexes.

(2) A matching record item in the dimension table is directly located for the fact table according to the foreign key attribute through the address mapping of the surrogate key, thereby reducing the complexity of the join algorithm, and improving the performance and efficiency of the multi-table star join operation.

(3) All OLAP processing tasks can be completed by just performing one-pass column scan on the fact table, thereby avoiding the cost of multiple times of column scan.

(4) Parallel processing of various aggregate functions can be supported.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE PREFERRED EMBODIMENTS

The core of the OLAP query processing is star-join, that is, performing group-by aggregate calculation on join results on the basis of joining of a fact table and multiple dimension tables. Based on this, the present invention provides a multi-dimensional OLAP query processing method. The method implements high-performance memory star join processing on the basis of a column store data warehouse, and completes all OLAP query processing tasks through one-pass column scan on the fact table, which is especially suitable for being applied to a multi-core processor platform. In view of the above characteristics of the OLAP query processing method, the inventors call the method a CDDTA-JOIN (Column Directly Dimensional Tuple Accessing-JOIN) method for short. The method is specifically illustrated hereinafter.

Figure 1:
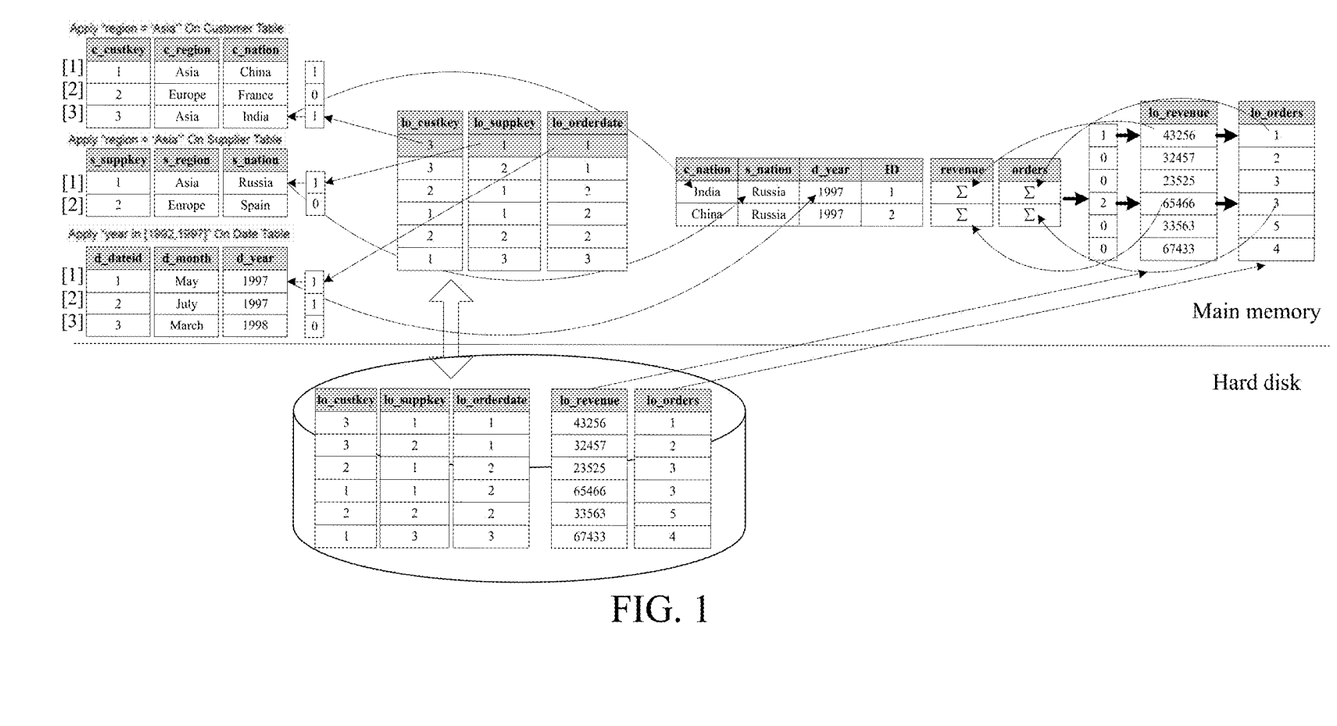
FIG. 1 is a schematic view of a data structure and a query processing flow of a CDDTA-JOIN method provided in the present invention.

FIG. 1 shows a data structure and a query processing flow of the CDDTA-JOIN method provided in the present invention. The core technical spirit of the method lies in dividing the standard OLAP query into a bitmap filtering operation, a group-by operation and an aggregate operation. In the bitmap filtering operation, first, a predicate (including, but not limited to, a where clause in an SQL command) is executed on a dimension table to generate a predicate vector bitmap, and a join operation is converted, through address mapping of a surrogate key, into a direct dimension table tuple access operation, thereby implementing access according to a position. The group-by operation is used to pre-generate the fact table tuple satisfying the join filtering condition into group-by units according to group-by attributes in the SQL command, and allocate increasing IDs. In the aggregate operation, group-by aggregate calculation is performed according to group-by units of the bitmap filtering operation result through a one-pass column scan algorithm on the fact table measure attribute. The group-by aggregate calculation refers to first performing a group-by operation, and performing an aggregate operation according to groups, including a group-by aggregate hash table and a group-by aggregate operation. In this way, temporary data required by the OLAP query processing is minimized into the predicate vector on the dimension table and the filtering group-by vector on the fact table, which is capable of guaranteeing memory-resident performance of the temporary data, thereby ensuring the high performance of the OLAP query processing.

In this CDDTA-JOIN method, the data including the fact table and the dimension tables is stored by adopting a column store model. A dimension table primary key is a surrogate key, that is, a naturally increasing sequence of numbers 1, 2, 3 . . . . The dimension table non-surrogate primary key is mapped to a surrogate key in real time in the access through a dynamic conversion rule. All or part of dimensional attribute columns (predicate attribute columns and group-by attribute columns) are loaded into the memory through a memory column store technology, so as to form a memory dimensional attribute array, in which the primary key is corresponding to a subscript of the memory dimensional attribute array. A foreign key attribute value of the fact table tuple is directly mapped to a memory dimensional attribute array subscript in a corresponding dimension table. The fact table and the dimension tables complete a multi-table join operation (for example, star-join) through the corresponding relation between the foreign key and the primary key, so that the fact table directly accesses a data item of a designated subscript in the memory dimensional attribute array according to the foreign key attribute value. The above technical solution that a matching record item in the dimension table is directly located by the fact table according to the foreign key attribute value through the address mapping of the surrogate key reduces the complexity of the join algorithm and improves the performance and efficiency of the join algorithm.

When the memory is sufficient, the dimension tables are all loaded into the memory to be stored in a vector structure, in which a vector subscript is corresponding to a dimension table surrogate key value. When the memory cannot accommodate all dimension tables, dimension table group-by attribute columns need to be accessed during the query processing are loaded into the memory to form a memory dimensional vector, the predicate operation is performed on the dimension tables, and predicate operation results are stored in a bitmap with the same length as the dimension table, so as to serve as predicate vectors for recording satisfaction states of different dimension table records with the predicate operation results (1 indicates satisfying all predicate operations, and 0 indicates not satisfying).

If the capacity of the memory is insufficient to accommodate all dimension table records, memorization of the dimension tables is performed according to the following priority: group-by attributes→predicate operation attributes→all dimensional attributes. The dimensional attributes may adopt the data compression technology when being stored in columns of the memory, so as to further reduce the memory consumption. The group-by attributes and the predicate operation attributes may be loaded in an incremental manner during the query processing, and in the memory dimensional attribute management, dimensional attribute columns of low access frequency are eliminated according to a least recently used (LRU) policy, so as to accommodate new dimensional attribute columns.

The so-called predicate vector refers to that the predicate operation (including, but not limited to, a where clause in the SQL command) in the SQL command is applied to the corresponding dimension table, and a bitmap for indicating whether each dimension table record satisfies all predicate conditions, called a predicate vector, is generated. When the fact table tuple is sequentially scanned and the multi-table join is performed, accessing the dimension table predicate vector replaces the access to the data item in the dimensional attribute array and the predicate calculation, and the predicate vector is used as a join filtering determination condition on the dimension table.

During the query processing, each dimension table only has a predicate vector and dimension table group-by attributes accessed by the query that need to be loaded to the memory, thereby reducing the requirement on the memory space.

In the following, the processing procedure of the CDDTA-JOIN method is specifically illustrated by using the following query as an example.

SELECT c_nation, s_nation, d_year sum(lo_revenue) as revenue, sum(lo_orders) as orders

```
FROM customer, supplier, date, lineorder
WHERE lo_custkey = c_custkey
AND lo_suppkey = s_suppkey
AND lo_orderdate = dateid
AND c_region = 'Asia'
AND s_region = ' Asia '
AND d_year in [1992, 1997]
GROUP-BY c_nation, s_nation, d_year
```

First, a group-by aggregate hash table is pre-created according to a group-by aggregate attribute of the query. A filtering group-by vector is created for the fact table, for indicating a position of a fact table record satisfying the join filtering condition and an ID of a corresponding hash group-by aggregate unit. The group-by aggregate hash table is pre-created by using the group-by attributes in the query and additional automatically accumulated IDs as objects, and does not include an aggregate function field. The fact table filtering group-by vector is a numerical vector with the same length as the fact table (the width of the numerical data is determined according to the aggregate group-by maximum ID value), and is preset as 0. The vector is formed by first filtering and then performing group-by operation, and therefore, it is referred to as the filtering group-by vector.

Foreign key attribute groups in the fact table and having dimension table join relation are sequentially scanned, each foreign key attribute group record is read, the fact table foreign key attribute value is directly mapped to the predicate vector subscript, and bit data recorded by the bit in the predicate vector is taken out to perform an AND bit operation. If a result of the bit operation is false, the next foreign key attribute group record is read; and if the result of the bit operation is true, the value of each foreign key is mapped to a subscript of the dimension table group-by attribute vector. A designated data item in the group-by dimensional attribute vector is extracted, and then hash group-by is performed. If the current hash key value exists, the hash group ID is taken out and recorded in a position in the fact table filtering group-by vector and corresponding to the current fact table tuple; and if the current hash key value does not exist, a new hash group is created in the group-by hash table and allocated with an increasing ID, and at the same time, the hash group ID is recorded in a position in the fact table join vector and corresponding to the current fact table tuple. After completing the scan of the fact table foreign key attribute groups, the fact table filtering group-by vector and a preset group-by aggregate hash table are obtained, and an array of aggregate functions is created according to the maximum ID value to serve as a group-by aggregate accumulator.

Referring to the embodiment shown in FIG. 1, it is assumed that dimension tables are all loaded to form the memory dimensional vectors, and corresponding predicates are applied on three dimension tables to obtain predicate vectors in the form of bitmaps. First, foreign key columns lo_custkey, lo_suppkey, lo_orderdate of the three dimension tables are scanned on the disk, for example, when a fact table foreign key attribute group record (3, 1, 1) (darker part in FIG. 1 represents the current access record) is scanned, the $3^{rd}$, $1^{st}$, and $1^{st}$ bits in the predicate vectors of customer, supplier, and date dimension tables are accessed simultaneously to perform the AND bit operation. If the result of the bit operation is 1, attribute values "India", "Russia", 1997 at the $3^{th}$, $1^{st}$, and $1^{st}$ bits of the dimensional vectors c_nation, s_nation, d_year are extracted and calculated to obtain a corresponding hash key value. The group-by aggregate hash table is looked up to search for the hash key value, and if the hash key value exists, an ID value of the hash group is recorded in a corresponding position of the fact table filtering group-by vector; and if no identical hash key value exists, a new hash group is created and allocated with an increasing ID, and at the same time, the ID is recorded in a corresponding position of the fact table filtering group-by vector. After the scan of the fact table foreign key attribute groups is completed, the group-by aggregate hash table and the fact table filtering group-by vector are generated.

The fact table filtering group-by vector is then scanned, and aggregate calculations in the query are processed respectively. When a non-zero data item is scanned in the fact table filtering group-by vector, a measure attribute column stored in the disk is accessed according to the position of the vector subscript (requiring that the database supports the access to disk column stored data according to an offset position), the measure attribute value is sent to a unit with a corresponding subscript of the group-by aggregate accumulator array that is the same as the hash group ID value in the fact table filtering group-by vector, so as to perform the aggregate calculation (that is, accumulation), and a result is updated. For example, in FIG. 1, a measure value 43256 is accumulated to a first unit of a revenue array, and a measure value 65466 is accumulated to a second unit of the revenue array. After completing the processing of the measure attribute revenue, the fact table filtering group-by vector is scanned again, and the aggregate calculation is performed on the measure attribute lo_order.

An aggregate calculation array (group-by aggregate accumulator) is created according to the maximum value of IDs in the group-by aggregate hash table, in which the array subscript is corresponding to the hash group ID of the group-by aggregate accumulator. Here, the group-by aggregate accumulator refers to generating an array for each aggregate function in the SQL command according to the number of hash group generator IDs, and is used to store the group-by aggregate calculation result when one-pass column scan is performed on the fact table measure attribute. During the scan of the join result vector, when encountering a non-zero vector data item, a measure value at a corresponding position of the fact table attribute column is accessed according to the position of the non-zero vector data item, and according to an ID corresponding to the join result vector value, the aggregate calculation is performed on the measure attribute value in a data unit of the group-by aggregate accumulator array and corresponding to the ID.

After all the measure attribute columns complete the aggregate calculation, the group-by aggregate hash table and each group-by aggregate accumulator array are merged according to a sequence of the IDs and the array subscripts, so as to generate a final OLAP aggregate result (that is, a query processing result).

In the access to the measure attribute column, the present invention, on one hand, avoids performing multiple times of scan on the join attribute column to obtain the final join result as in the conventional column processing algorithm; and on the other hand, is capable of implementing direct access to the fact table measure attribute column according to the position after obtaining the fact table filtering group-by vector through the bitmap filtering operation. When the overall selectivity of the query is low (the selectivity on each dimension table is relatively high, but the join operation performed on the multiple dimension tables results in the low final selectivity), this method can greatly reduce the I/O cost or memory bandwidth consumption for accessing the fact table measure attribute column.

The group-by aggregate hash table refers to implementing the star join between the fact table and the multiple dimension tables through the bitmap filtering operation (the predicate vector serves as a join filter on the dimension table) and the access to the dimension table record according to the position. Before the multi-table join operation is executed, the fact table filtering group-by vector and a pre-group-by hash table are pre-generated. The fact table filtering group-by vector records a hash group ID corresponding to the fact table tuple satisfying the join filtering condition. When the multi-table join operation is performed, each fact table tuple satisfying all dimension table predicate vector filtering conditions directly accesses a data item corresponding to the dimension table group-by attribute column array subscript according to the foreign key attribute value, and a group-by attribute value is extracted and matched with the group-by hash table. If the identical group item is found in the group-by aggregate hash table, a hash group ID value is copied to a position in the join result vector and corresponding to the fact table tuple; and if no identical group item is found in the group-by aggregate hash table, a new hash group item is added and allocated with an increasing group ID, and the hash group ID is copied to the position in the fact table filtering group-by vector and corresponding to the fact table tuple. After the scan of the fact table foreign key attribute group is completed, the group-by aggregate hash table and the fact table filtering group-by vector are generated.

Figure 2:
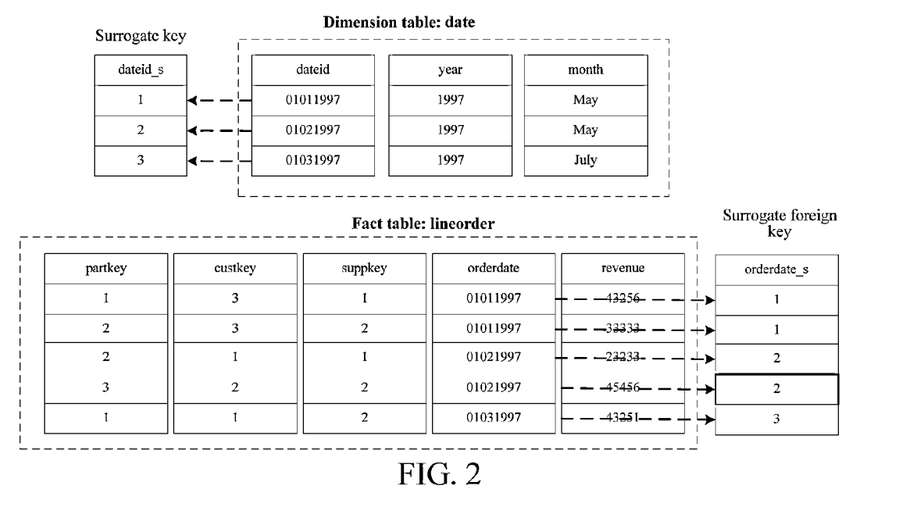
FIG. 2 is a schematic view of performing key value conversion on a dimension table primary key that is not a surrogate key.

As described above, the dimension table primary key that is not a surrogate key is mapped to a surrogate key in real time in the access through the dynamic conversion rule. FIG. 2 shows the key value conversion performed on the dimension table primary key that is not the surrogate key. A primary key of the dimension table date is not a standard surrogate key, and a general method is adding a surrogate key dateid_s for the dimension table date to replace the original primary key dateid. Two manners may be adopted for the foreign key orderdate in the fact table: one is directly updating the original foreign key to a new surrogate key value; and the other is adding a new surrogate foreign key column in the fact table, and updating the surrogate foreign key orderdate_s column according to the original foreign key attribute value. The conversion procedure needs to add an additional column both in the small dimension table and the large fact table, and completes data update on the fact table foreign key column through inter-table join operation. The column store ensures that the storage and updating of the additional column have high I/O efficiency. The converted foreign key attribute value represents an offset position of the dimension table record having the join relation therewith, can be mapped to a subscript of the memory dimensional attribute vector, and the dimensional attribute data item can be directly accessed through the foreign key attribute value.

In the present invention, the aggregate processing on the measure attribute adopting the manner of one-pass column scan can ensure the sequential access to the column store data, has the desired I/O performance, but residence of the fact table filtering group-by vector in the memory needs to be guaranteed and the multiple measure attribute columns need to be scanned according to the number of the aggregate functions. Therefore, the present invention provides another implementation solution, that is, implementing the CDDTA-JOIN query processing of a row access mode through a row access interface provided by the column store database (the database dynamically converts data from multiple query-related columns into row tuples). The specific illustration is provided as follows.

Figure 3:
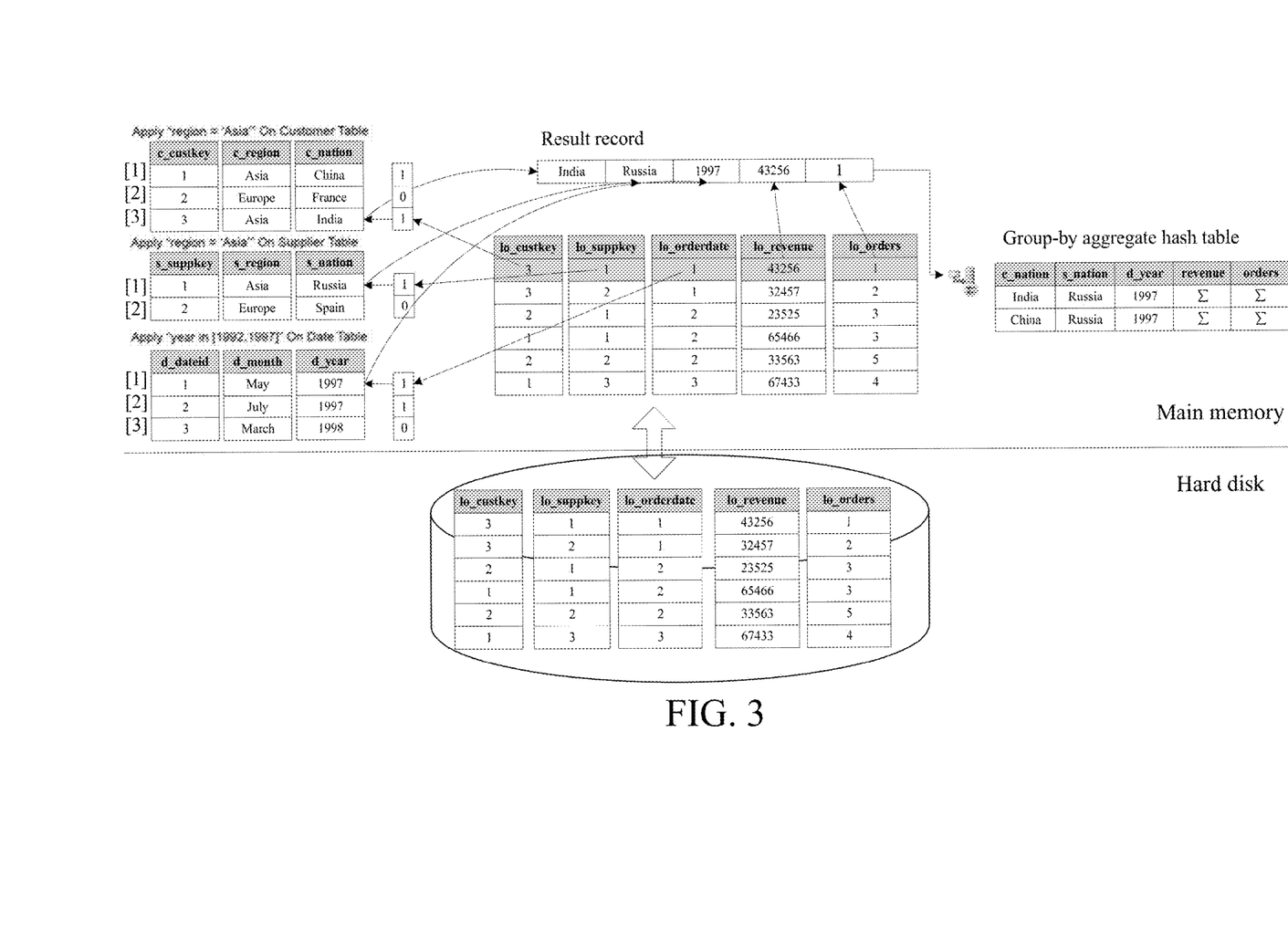
FIG. 3 is a schematic view of a CDDTA-JOIN method in a row access mode.

FIG. 3 shows a CDDTA-JOIN query processing procedure in the row access mode. First, query-related foreign key attribute groups lo_custkey, lo_suppkey, lo_orderdate, lo_revenue, lo_orders are accessed in a row manner, and a join filtering operation according to a dimension table predicate vector is completed. For a record satisfying the filtering condition, a group-by attribute value is directly extracted from the dimension table group-by attribute vector and combined with a result of an aggregate function expression to form a query result record, and the query result record is pushed into the group-by aggregate hash table to complete the group-by aggregate calculation. The CDDTA-JOIN query processing in the row access mode does not need to pre-generate the group-by aggregate hash table and the fact table filtering group-by vector, and eliminates the multiple times of scan on the fact table filtering group-by vector during the aggregate calculation. However, in the row access mode, the database needs to convert column data into row data in a cache, the access to the multiple attributes results in a lot of random access operations in the disk, and the access according to the position cannot be achieved for the measure attribute of low selectivity, thereby affecting the I/O performance to some extent.

In addition, when an external memory adopts a storage device with the parallel I/O capabilities, for example, a device such as a RAID disk array and a solid state disk (SSD), the parallel CDDTA-JOIN query processing procedure may be supported through the parallel I/O access performance.

Figure 4:
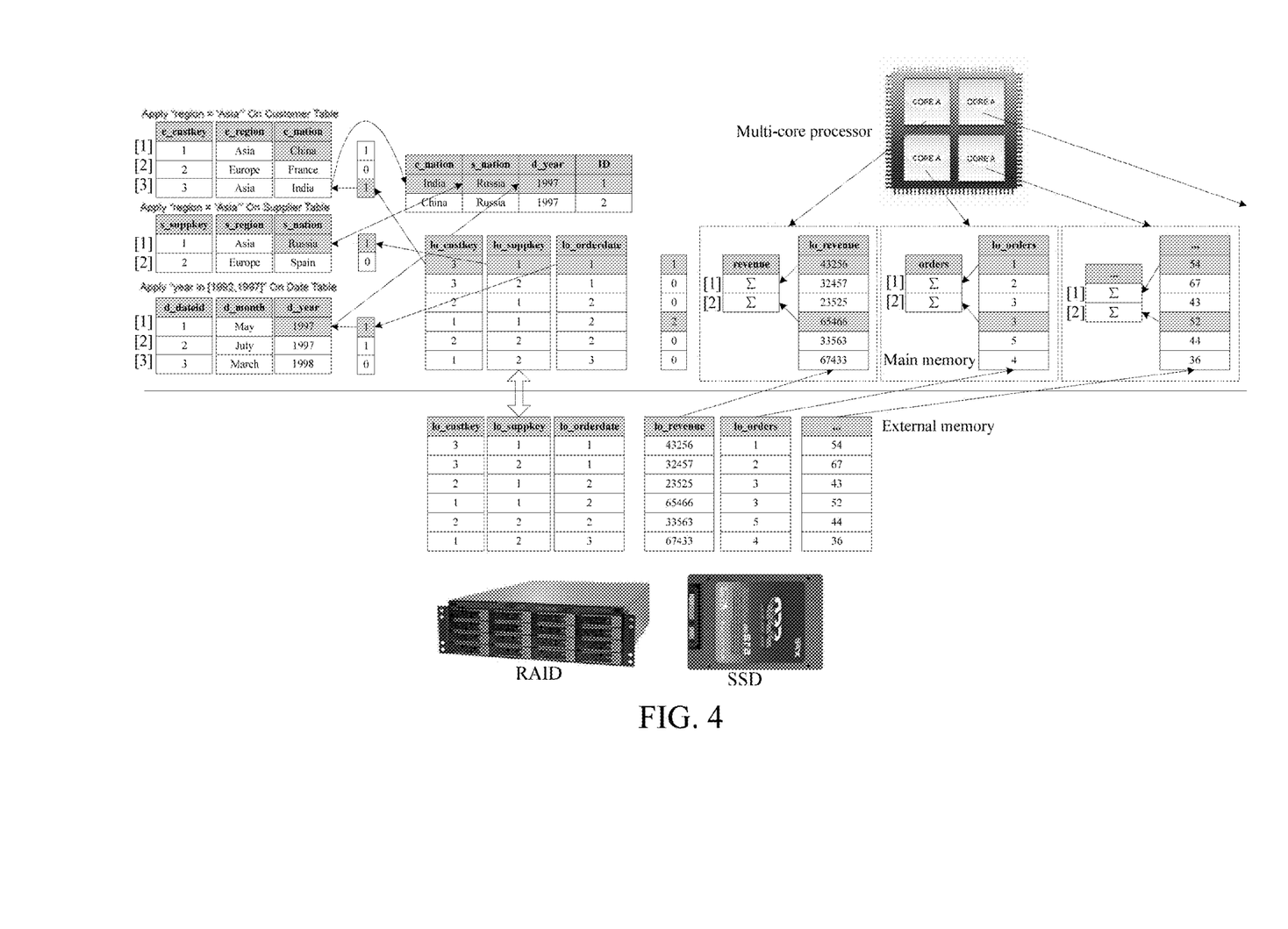
FIG. 4 is a schematic view of a parallel CDDTA-JOIN method when the query includes multiple aggregate functions.

FIG. 4 shows a parallel CDDTA-JOIN query processing procedure when a query processing procedure includes multiple aggregate functions.

First, a fact table filtering group-by vector is created through scan of a fact table foreign key attribute group, predicate vector filtering, and pre-hash group-by aggregation.

Next, an aggregate processing thread is created for each aggregate function, respective group-by aggregate accumulator arrays are created in the threads, measure attribute columns are accessed according to positions through shared access of the fact table filtering group-by vector, and aggregate calculation is performed.

After the processing of each aggregate processing thread is completed, an independent group-by aggregate accumulator of each aggregate processing thread and the pre-group-by aggregate hash table are merged into a query aggregate result set.

The above multi-core parallel calculation oriented to multiple aggregate functions is corresponding to an application scenario having many aggregate calculation attributes or non-distributed aggregate calculation functions (such as median aggregate functions, percentile aggregate functions, and TOP k functions), that is, a dedicated processing thread is allocated for each aggregate function through the multi-core parallel technology, thereby implementing the parallel aggregate calculation.

During the OLAP query processing, if the query includes multiple distributed aggregate functions, each aggregate function is processed sequentially by scanning a join result vector of the fact table.

Specifically, when the query includes multiple distributed aggregate functions, an aggregate processing thread may be allocated for each aggregate function, the aggregate processing threads share access to the fact table join result vector and independently access fact table measure attribute columns corresponding to the aggregate functions, group-by aggregate results are updated to the group-by aggregate accumulators corresponding to respective aggregate functions so as to complete the aggregate calculation on the measure columns, and the results are finally merged into a global query processing result.

When the query processing procedure includes few distributed aggregate functions, a fact table fragment is allocated for each thread through fact table horizontal fragmentation, the fact table fragments are scanned in parallel, the predicate vector and the dimension table group-by attribute column are accessed in a shared manner through the CDDTA-JOIN method provided in the present invention, each fact table fragment maintains its own private group-by aggregate hash table, a query processing task is implemented independently on the respective fact table fragment, and finally, query result subsets of the fact table fragments are merged into a global query result.

When the query processing procedure includes non-distributed aggregate functions and the group-by operation, by taking an median aggregate function as an example, first, a processing thread is allocated for each group ID, when the fact table join result vector is scanned, data with the measure attribute satisfying the filtering condition is allocated to the corresponding processing thread according to the hash group ID, each processing thread independently completes the median aggregate calculation, and a median result is recorded in a unit of the group-by aggregate accumulator array and corresponding to the ID.

Figure 5:
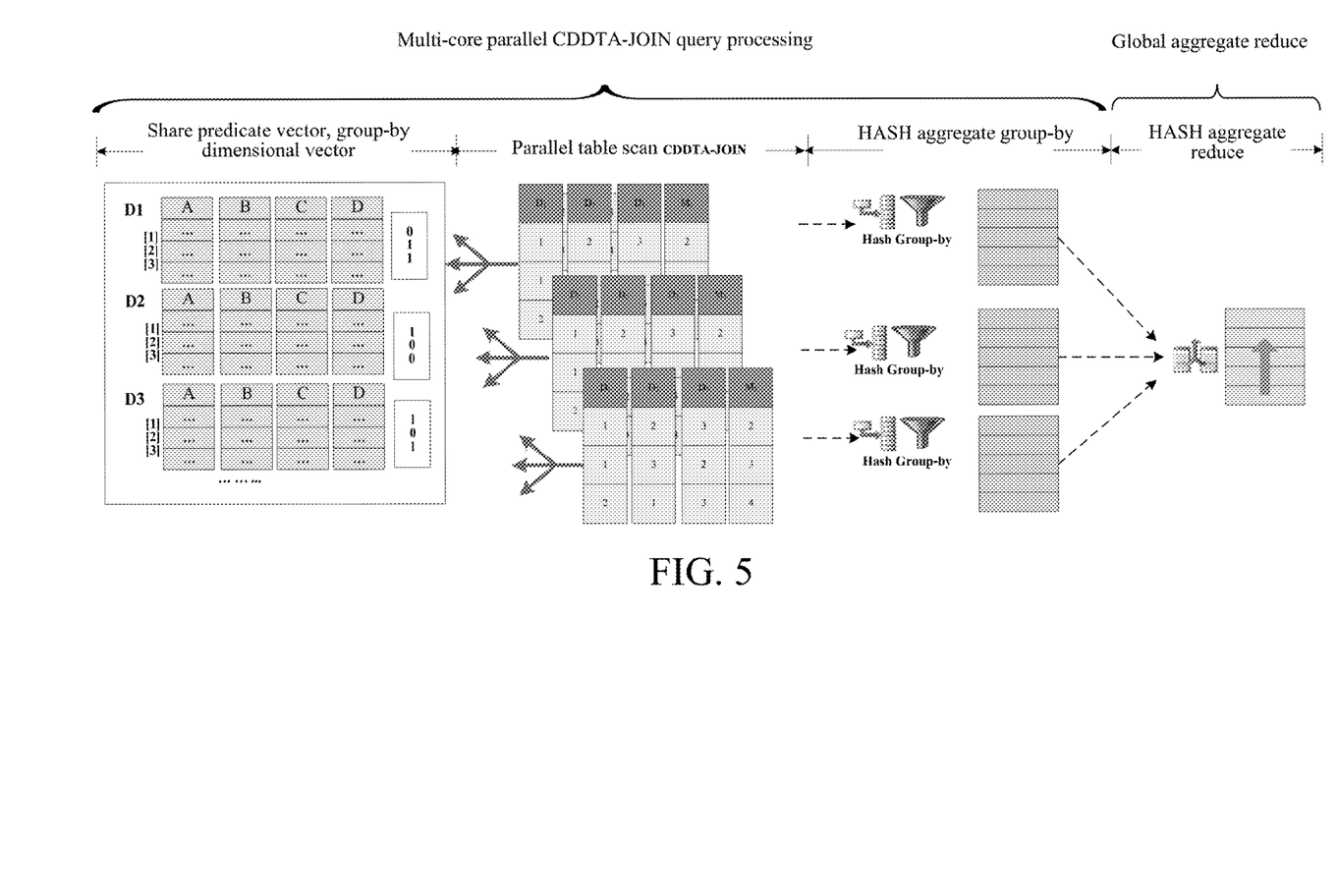
FIG. 5 is a schematic view of a parallel CDDTA-JOIN method adopting a fact table horizontal fragmentation mode.

FIG. 5 shows a parallel CDDTA-JOIN query processing procedure adopting a fact table horizontal fragmentation mode. The fact table is horizontally divided into multiple physical fragments, and each physical fragment is allocated with a query processing thread. In each of the parallel query processing threads, the CDDTA-JOIN method based on the row access mode (referring to FIG. 3) is executed. The predicate vector and the group-by dimensional attribute vector are accessed by the query processing threads in a shared manner, and each query processing thread independently executes the group-by aggregate calculation. Finally, group-by aggregate results of the query processing threads are reduced to a global group-by aggregate result. The multi-core parallel calculation oriented to the fact table horizontal fragmentation is corresponding to distributed aggregate calculation functions (such as sum, count, average, and variance), that is, the fact table is horizontally divided into multiple fragments, each column store horizontal fragment completes the independent parallel OLAP processing, and a global OLAP processing thread is used to implement the reduce calculation of horizontal fragment aggregate result sets.

Figure 6:
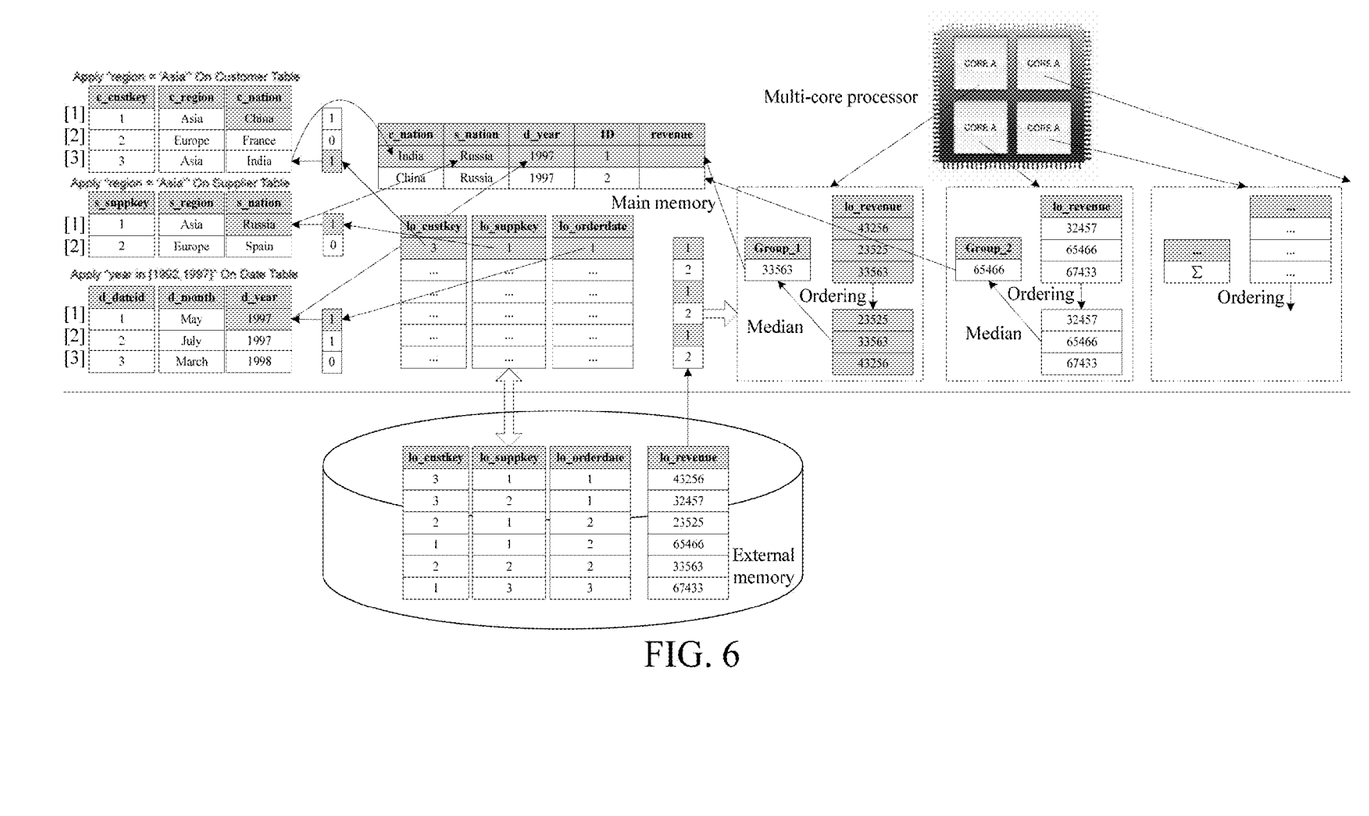
FIG. 6 is a schematic view of a multi-core parallel algorithm for non-distributed aggregate functions, in which a median aggregate function is taken as an example.

For the distributed calculation aggregate functions, a processing thread is allocated for each aggregate function, the processing threads share access to the join result vector, and the group-by aggregate result is updated to the group-by aggregate accumulator corresponding to each aggregate function. For the non-distributed calculation aggregate functions, a processing thread is allocated for a group of each aggregate function (one aggregate function may involve one or more measure attributes), the processing threads execute centralized aggregate calculation in parallel, and final aggregate calculation results are updated to corresponding units of the group-by aggregate accumulator array. FIG. 6 shows a multi-core parallel processing procedure for non-distributed aggregate functions, in which a median aggregate function is taken as an example. Specific operation steps are described as follows.

First, a fact table filtering group-by vector is created through scan of a fact table foreign key attribute group, predicate vector filtering, and pre-hash group-by aggregation.

Read fact table measure attributes are categorized into multiple group-by datasets according to a group ID of the fact table filtering group-by vector.

A processing thread is allocated for each group-by dataset.

The median aggregate calculation is independently executed in each processing thread, and a median result is calculated after ordering the group-by data.

After the processing threads complete the execution, the median result of each thread is copied to a corresponding aggregate result unit in the group-by aggregate hash table, so as to complete global aggregate calculation.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A multi-dimensional on-line analytical processing (OLAP) query processing method oriented to a column store data warehouse, an OLAP query being divided into a bitmap filtering operation, a group-by operation and an aggregate operation; among them, a fact table and dimension tables being stored by adopting a column store model, a dimensional attribute column is loaded into main memory to form a memory dimensional attribute array, wherein a primary key is corresponding to a subscript of the memory dimensional attribute array; a foreign key attribute value of the fact table tuple is mapped to a subscript of the memory dimensional attribute array in the corresponding dimension table; and the fact table and the dimension tables complete a multi-table join operation through a corresponding relation between the foreign key and the primary key, wherein:

in the bitmap filtering operation, a predicate is executed on the dimension table to generate a predicate vector bitmap, and a join operation is converted, through address mapping of a surrogate key, into a direct dimension table tuple access operation, thereby implementing access according to a position;

in the group-by operation, a fact table tuple satisfying a filtering condition is pre-generated into a group-by unit according to a group-by attribute in an SQL command and is allocated with an increasing ID; and in the aggregate operation, group-by aggregate calculation is performed according to a group item of a fact table filtering group-by vector through one-pass column scan on a fact table measure attribute.

2. The multi-dimensional OLAP query processing method oriented to a column store data warehouse according to claim 1, wherein:

when the memory cannot accommodate all dimension tables, dimension table group-by attribute columns need to be accessed in the query processing are loaded into the memory to form memory dimensional vectors, a predicate operation is performed on the dimension tables, and predicate operation results are stored in a bitmap with the same length as the dimension table, to serve as predicate vectors for recording satisfaction states of different dimension table records with the predicate operation results.

3. The multi-dimensional OLAP query processing method oriented to a column store data warehouse according to claim 1, wherein:

a group-by aggregate hash table and a fact table filtering group-by vector are pre-created, wherein the group-by aggregate hash table is pre-created by using the group-by attributes and additional IDs in the query as objects, and the fact table filtering group-by vector is a numerical vector having the same length as the fact table.

4. The multi-dimensional OLAP query processing method oriented to a column store data warehouse according to claim 1, wherein:

foreign key attribute groups having dimension table join relation in the fact table are sequentially scanned, each foreign key attribute group record is read, the fact table foreign key attribute value is directly mapped to a predicate vector subscript, and bit data recorded by the bit in the predicate vector is taken out to perform an AND operation; and if a result of the bit operation is false, the next foreign key attribute group record is read; and if the result of the bit operation is true, the value of each foreign key is mapped to a subscript of a dimension table group-by attribute vector.

5. The multi-dimensional OLAP query processing method oriented to a column store data warehouse according to claim 1, wherein:

a designated data item in a group-by dimensional attribute vector is extracted and then hash group-by is performed, and if a current hash key value exists, the hash group ID is taken out and recorded in a position in the fact table filtering group-by vector and corresponding to the current fact table tuple; and if the current hash key value does not exist, a new hash group is created in the group-by hash table and allocated with an increasing ID, and at the same time, the hash group ID is recorded in a position in the fact table join vector and corresponding to the current fact table tuple.

6. The multi-dimensional OLAP query processing method oriented to a column store data warehouse according to claim 1, wherein:

after the scan of the fact table foreign key attribute group is completed, the fact table filtering group-by vector and a preset group-by aggregate hash table are obtained, and an array of aggregate functions is created according to a maximum ID value to serve as a group-by aggregate accumulator.

7. The multi-dimensional OLAP query processing method oriented to a column store data warehouse according to claim 6, wherein:

when a non-zero data item is scanned in the fact table filtering group-by vector, a measure attribute column stored in a disk is accessed according to a vector subscript position, and the measure attribute value is sent to a unit with a subscript of the group-by aggregate accumulator array corresponding to the hash group ID value in the fact table filtering group-by vector, so as to perform the aggregate calculation.

8. The multi-dimensional OLAP query processing method oriented to a column store data warehouse according to claim 7, wherein:
after the aggregate calculation is completed for all the measure attribute columns, the group-by aggregate hash table and each group-by aggregate accumulator are merged according to a sequence of the IDs and the array subscripts, so as to generate a final OLAP aggregate result.

9. The multi-dimensional OLAP query processing method oriented to a column store data warehouse according to claim 1, wherein:
if the query processing procedure comprises multiple distributed aggregate functions, each distributed aggregate function is processed sequentially by scanning a fact table join result vector.

10. A multi-dimensional on-line analytical processing (OLAP) query processing method oriented to a column store data warehouse, an OLAP query being divided into a bitmap filtering operation, a group-by operation and an aggregate operation, a fact table and dimension tables being stored by adopting a column store model, wherein:
in the bitmap filtering operation, a predicate is executed on the dimension table to generate a predicate vector bitmap, and a join operation is converted, through address mapping of a surrogate key, into a direct dimension table tuple access operation, thereby implementing access according to a position;
in the group-by operation, a fact table tuple satisfying a filtering condition is pre-generated into a group-by unit according to a group-by attribute in an SQL command and is allocated with an increasing ID;
in the aggregate operation, group-by aggregate calculation is performed according to a group item of a fact table filtering group-by vector through one-pass column scan on a fact table measure attribute;
after the scan of the fact table foreign key attribute group is completed, the fact table filtering group-by vector and a preset group-by aggregate hash table are obtained, and an array of aggregate functions is created according to a maximum ID value to serve as a group-by aggregate accumulator; and
when a non-zero data item is scanned in the fact table filtering group-by vector, a measure attribute column stored in a disk is accessed according to a vector subscript position, and the measure attribute value is sent to a unit with a subscript of the group-by aggregate accumulator array corresponding to the hash group ID value in the fact table filtering group-by vector, so as to perform the aggregate calculation.

* * * * *